United States Patent [19]

Jäger et al.

[11] Patent Number: 4,487,575
[45] Date of Patent: Dec. 11, 1984

[54] METHOD AND APPARATUS FOR MONITORING ROTARY DRUMS DURING THERMAL PROCESSING

[75] Inventors: Gernot Jäger, Cologne; Hubert Spitz, Overath; Herbert Specht, Taunusstein-Neuhof, all of Fed. Rep. of Germany

[73] Assignee: Klöckner-Humboldt-Deutz AG, Fed. Rep. of Germany

[21] Appl. No.: 471,703

[22] Filed: Mar. 3, 1983

[30] Foreign Application Priority Data

Mar. 13, 1982 [DE] Fed. Rep. of Germany ....... 3209191
Sep. 30, 1982 [DE] Fed. Rep. of Germany ....... 3236215

[51] Int. Cl.³ .................... F27B 1/26; F27D 19/00; F23N 1/00
[52] U.S. Cl. .................... 432/1; 236/15 BR; 432/36; 432/50
[58] Field of Search .............. 432/1, 36, 37, 50; 236/15 BR; 364/557

[56] References Cited

U.S. PATENT DOCUMENTS 3,606,284 9/1971 Hurlbut et al. ................... 432/37

FOREIGN PATENT DOCUMENTS 2702301 7/1978 Fed. Rep. of Germany ........ 432/36

*Primary Examiner*—John J. Camby
*Attorney, Agent, or Firm*—Hill, Van Santen, Steadman & Simpson

[57] ABSTRACT

A method and apparatus for monitoring the operation of a rotary drum such as a rotary kiln while engaged in thermal processing of fine grained materials such as cement which involves measuring the temperature distribution existing instantaneously during such processing by means of one or more sensors which are not in contact with the drum and comparing the distribution with other parameters related to the thermal processing. Such other parameters may include, for example, the rate of fuel feed, the rate of raw material input, the drum speed, and the driving power supplied to the drum.

17 Claims, 6 Drawing Figures

METHOD AND APPARATUS FOR MONITORING ROTARY DRUMS DURING THERMAL PROCESSING

BACKGROUND OF THE INVENTION

1. Field of the Invention

This invention is in the field of sensing operating conditions existing in rotating rotary drums which are performing thermal processing.

2. Description of the Prior Art

The need for sophisticated monitoring increases with increasing size of rotary tubular kiln units. Some units employed today have daily outputs of 4,000 metric tons of clinker and more. A careful monitoring is required in order to reduce the number of kiln shutdowns due to lining damage, and thereby reduce the costs. It is particularly important to detect incipient damage at early stages insofar as possible, together with irregularities of material deposits in the inside of the kiln, ring formations, and fractures all of which are manifested by temperature changes of the interior surfaces of the rotary tubular kiln. Experience has shown that suitable countermeasures instituted at an early point in time result in low shutdown times and thus lower production stoppages. Particular problems are involved in the use of complex measuring systems, however, in that the environment in which the rotary kiln is located is normally very dusty and corrosive and is characterized by humidity and vibrations which require the employment of particularly rugged devices which are easy to manipulate.

One of the systems employed for monitoring the temperature of a rotary tubular kiln involves the use of a rugged radiation thermometer which responds slowly and has a large aperture angle. The thermometer is disposed on a rail so as to be displaceable parallel to and at a short distance from the convex surface of the rotary tubular kiln. A detection of the entire surface of the rotary kiln, however, is only achieved after the lapse of a relatively long time interval. Consequently, a rapid perception of incipient lining damage is therefore not readily available.

A further possibility is the disposition of a stationary, pivotable radiation thermometer having a large aperture angle. With a long rotary tubular kiln, however, there is a diminished resolution in the end areas which can be countered only by restricting the scanning angle and, of necessity, employing a plurality of such devices.

An improved detection device for measuring surface temperatures of rotary tubular kilns is disclosed in the publication "AGA Cemscanner, An Infrared System for Real-Time Monitoring of Rotary Kilns" published in 1978. This article suggests measuring devices which have a small aperture angle and a revolving optical system. The measurement is based on a scanning of the surface conducted along a line carried out at such speed that the circumferential speed of the rotary tubular kiln is insignificant in comparison. The emitted radiation thereby proceeds over a rotatably seated prism onto a semiconductor detector which emits an electrical signal corresponding thereto. The device is equipped with a reference radiator which together with the optical system is encapsulated in a steel housing which, in turn, is accommodated in a protective housing which may be climate controlled. The protective housing is disposed in spaced relation from the rotary tubular kiln with the spacing determined by the length of the rotary tubular kiln and the horizontally usable scanning angle. With this device, however, extensive protective measures are necessary in order to protect the highly complex device from the unfavorable environmental conditions in the rotary tubular kiln installation. The device requires a relatively large structural volume and its maintenance requires skilled technical personnel.

The measuring system described in this publication is self-contained and supplies measured values in analog form which are presented as different graphics describing the temperature distribution of the surface of the rotary tubular kiln. The temperature distribution is, in fact, an important parameter of rotary tubular kiln operation. However, the temperature distribution must be interpreted in conjunction with other parameters describing the thermal process or the operation of the rotary tubular kiln such, for example, as the raw material input, the rate of fuel feed, the speed of the drum, the driving power supplied, and the like in order to adjust accurately the metering of raw material and the fuel. A more inclusive evaluation of the identified measured values and their trends are not provided with the system described in this publication.

SUMMARY OF THE INVENTION

The present invention provides a method for monitoring the operating condition of rotary drums in which thermal processing is occurring, particularly rotary tubular kilns, which supplies as complete as possible a picture of the existing parameters, edits these into a form suitable for data processing for the process of further evaluation, and forms identifying values which describe unfavorable operating conditions or incipient disruptions.

The device of the present invention provides for contact-free measurement of the surface temperature of moving objects such as rotary drums which is characterized by simplicity, ruggedness, and precision and supplies the observed measured values in edited form suitable for further interpretation by a data processing system.

The process of the present invention is characterized in that the temperature distribution of the surface of the rotary tubular kiln is measured without contact with the surface, whereby an identifying value or values characterizing the momentary or instantaneous operating condition of the rotary tubular kiln and/or its changes are formed from the temperature distribution in conjunction with other parameters describing the thermal processing and the operation of the rotary tubular kiln. Thus, a contact-free measurement of the temperature distribution is incorporated into a more comprehensive context, namely, it is used in conjunction with other operating parameters in order to describe the operating behavior of the rotary drum or kiln. An improved evaluation feasibility of the measured results obtained is thus provided so that these measured values can be interpreted more properly in context.

The incorporation of the temperature measurement into the larger functional inter-relationship provides the possibility of a more sophisticated analysis of the actual conditions for the operating behavior in the time cycle which can be employed for optimizing the process conditions and, ultimately, for quality improvement. Through the provision of a sensitive, continuous monitoring of the kiln lining, incipient damage can also be observed. In addition to irregularities of material deposited on the inside of the kiln and ring fractures, the respective specific thermal consumption of the combustion process and other parameters for which temperature distribution is of significance can be calculated.

In an embodiment of the invention, an infrared ray proceeding from the rotary tubular kiln is scanned line-by-line in the measurement of the temperature distribution from a stationary point, with the measured values being corrected according to measurements of a known, constantly maintained temperature at at least one reference radiator exposed to similar influences as the infrared scanner. Two reference radiators are preferably employed, their different temperatures corresponding to characteristic temperatures of the rotary tubular kiln. Since the reference radiators are exposed to identical disruptive influences, changes which occur in the passage of the beam between the test object and the measuring means are automatically taken into consideration so that the precision of the measured result is thereby not affected. In order to cover the entire measuring range, the different temperatures of the reference radiators are conveniently set to upper and lower limiting temperatures so that a correction of the measured values is possible in a linear manner. It is thus assured that the critical high and low temperatures are reliably detected even when there are large correction factors due to heavy contamination. As required, more than two radiators having different temperatures can be advantageously employed in order to provide corrections of a higher order and with a higher degree of precision.

In another form of the invention, the reference radiators are simultaneously employed as signal generators. The scanning of the rotary tubular kiln which is periodic due to the measuring operation and into which the reference radiators are also incorporated provides the possibility of providing a specific shape on the signal received from the radiators which can be used for recognizing the beginning and end of a line of the measuring operation or the direction of the scanning. The auxiliary means required for the formation of such signals can be quite simple and can, for example, be plates which have been provided with apertures of a specific size and sequence and which are disposed in the beam path of the reference radiators to provide pulse sequences for control and calibration purposes.

The device for measuring surface temperature is characterized in that the functional elements for editing measured values are disposed spatially separate from those for measuring the values. Sensitive electronic components can thus be transposed from an atmosphere characterized by high environmental contamination into, for example, the protected space of a control room so that the only device situated directly at the site is a measuring head with a relatively simple structure which contains only components which are relatively insensitive to external influences. By so doing, protective measures in the area of the measuring device can be reduced to a minimum thereby reducing not only the costs but also improving the accessibility of the device particularly insofar as maintenance and repair work are concerned. Furthermore, the space requirement and thus the overall installation outlay is considerably reduced in comparison to known devices and systems. The device of the present invention can be advantageously employed not only in the case of rotary kilns but also for detecting the surface temperature of any other moving objects such, for example, as sheet metal, plate glass, synthetic films, textiles, paper webs and the like.

In one embodiment of the invention, the elements which serve the purpose of editing the measured values include at least one micro-computer, electronic monitoring units, temperature calibration units, voltage supplies, and the like. Together with the elements which function to derive the measured values, these units form a closed system with the measured temperature values being in a form which is suitable for further processing in, for example, a higher ranking computer. A micro-computer is allocated to each measuring head. The integration of these measured temperature values into a larger functional inter-relationship including, for example, the parameters of the rotary tubular kiln is undertaken in a very advantageous manner in the higher ranking computer in order to identify specific characteristic values from which conclusions regarding the respective operating condition of the rotary tubular kiln can be gained.

In another form of the invention, the elements serving for the acquisition of the measured values are disposed inside a housing and at least one reference radiator at a known temperature is disposed outside the housing. With this arrangement, it is guaranteed that the infrared radiation proceeding from the rotary drum is exposed to an absorption effect due to dust deposited on the housing affecting both the sensing device and the reference radiator. Measuring errors which occur because of increasing dust coverage are thus automatically corrected. At the same time, the signal of the reference radiator can indicate the degree of dust coverage existing at any given moment and can thus serve the purpose of self-monitoring the measuring system.

In a preferred form of the invention, the elements which serve to acquire the measured values comprise essentially an optical system as well as an infrared sensor. These are the only components which are situated under the unfavorable environmental conditions. In addition, there are provided a spectrum filter for the infrared sensor, a preamplifier, as well as the aforementioned reference radiators. These components can be combined in a measuring head in the form of individual, replaceable modules. With this kind of an arrangement, repair work is significantly simplified.

In a further development of the present invention, a screen is disposed between the reference radiator and a deflection means, the screen being equipped with apertures for the formation of test signals. These apertures are of a definite size and sequence by means of which a periodically repeating pulse sequence can be transmitted to the deflection device. In addition to the scanning direction, the message content of the pulse sequence may consist of specifying the beginning and end of the measuring process of a line. These apertures, furthermore, can be employed in a very advantageous manner as means for dynamic self-calibration.

In a further development of the invention, the deflection means is equipped with a drive means to whose output shaft an encoder is attached. The digital encoder rigidly connected to the output shaft informs the microcomputer not only of its momentary position but also functions as a clock generator with which the microcomputer digitizes and further edits the analog signals of the device of the invention. With a plurality of such devices employed, synchronism fluctuations are eliminated and a synchronization is achieved even with different scanning speeds and scanning angle ranges.

In a preferred form of the invention, the deflection means consists of a prism. This prism may be rotatably seated about a vertical axis which deflects an infrared ray essentially incident in a horizontal plane in the direction toward the infrared sensor. The measurable scanning angle in the horizontal plane is limited by the emission characteristic of the rotary tubular kiln, and an angle up to approximately 120° can be examined. A two-sided measurement is fundamentally possible in that a device equipped with such a prism can be positioned between two rotary tubular kilns and can accept measured values from both kilns.

In a particularly preferred form of the invention, the deflection means is a wheel having a polygonal contour including end faces which are reflective for guidance of the beam. With a given speed of the drive of the deflection means, the scanning rate can be multiplied according to the number of sides of the polygonal contour.

BRIEF DESCRIPTION OF THE DRAWINGS

A further description of the present invention will be made in conjunction with the attached sheets of drawings in which.

DESCRIPTION OF THE PREFERRED EMBODIMENTS

Figure 1:
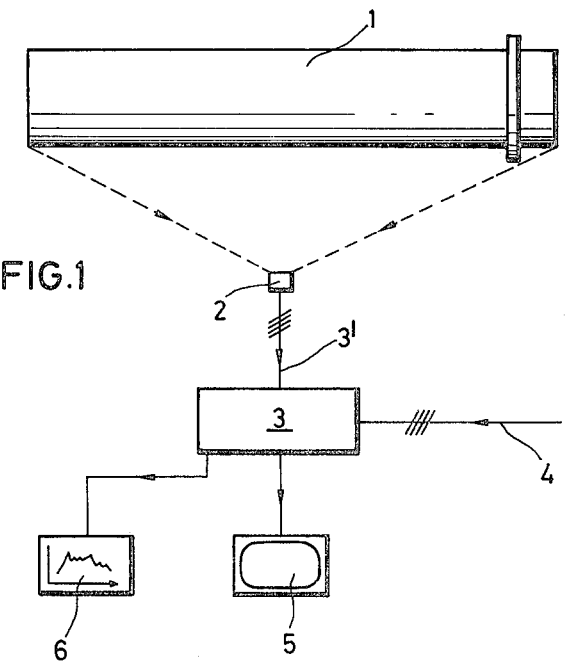
FIG. 1 is a schematic view of a device of the present invention positioned in front of a rotary tubular kiln.

In FIG. 1, reference numeral 1 indicates a rotary tubular kiln in front of which there is a sensing device 2 for contact-free measurement of the surface temperature. The surface of the kiln 1 with respect to its emission characteristics is such that the device 2 is spaced from the rotary tubular kiln with a scanning angle sufficient to cover the entire length. With particularly long rotary tubular kilns, a plurality of devices 2 whose horizontal scanning angles supplement each other can be disposed next to each other.

The scanning device 2 is located, for example, in a simple braced tower which is provided with suitable openings in the measuring direction. It is situated at such a height that the infrared radiation emitted by the rotary tubular kiln 1 can reach the device 2 as directly as possible and without shadows. The height of the device 2 should preferably at least correspond to the axis of rotation. The signals are transmitted over a line group 3' to a data processing unit 3 which is located in a separate space, for example, in the control room allocated to the rotary tubular kiln 1. The data processing unit 3 is connected to other value measuring detectors over a further line group 4 by means of which other operating parameters of the rotary tubular kiln installation are transmitted such, for example, as the power input to the drive of the kiln, the rate of fuel feed, and the like, which, together with the identified measured temperature values supply information concerning the momentary operating condition of the rotary tubular kiln or information regarding its long-time behavior.

These data can, for example, be represented on cathode ray tubes 5 or on printing and/or registering measuring instruments 6 as shown in FIG. 1.

The data processing unit 3 contains, among other things, a micro-computer which transforms measured temperature values into a form suitable for further processing in a data processing system such as a higher-order computer. These measured temperature values are thus available for any desired interpretation so that the device of the invention can also be applied to other moving test objects such, for example, as sheet metal, plate glass, synthetic films, textile materials, or paper webs. The data processing unit 3 thus comprises a plurality of function modules whose interfaces are arranged such that the device of the invention can be employed in any desired context insofar as the evaluation of the temperature measurement is concerned so that a very flexible measuring system is provided.

The spatial separation of the measuring device is important for the purposes of the present invention. The device 2 comprises means for generating electrical signals from the infrared radiation but, however, the evaluation of such data occurs at a different location which is protected in terms of environmental influences.

Figure 2:
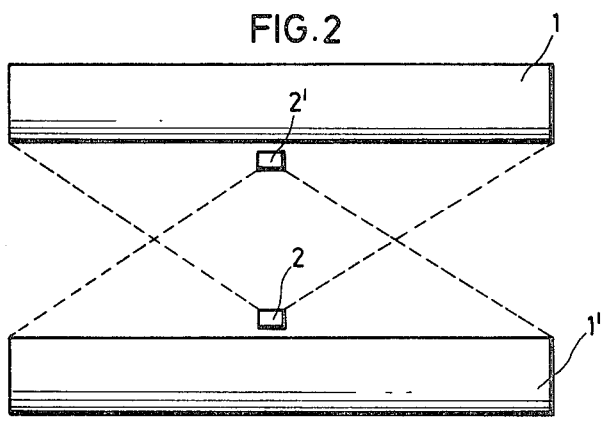
FIG. 2 is a modified form of the invention utilizing scanning devices between two rotary kilns.

FIG. 2 shows a disposition of two of the inventive devices 2 and 2' located between two rotary tubular kilns 1 and 1' in parallel. These devices can be directly secured to oppositely rotating tubular kilns as, for example, by being secured to their catwalks so that no auxiliary devices such as supporting poles are required for their support. It is, however, fundamentally possible to utilize a single device 2 in the center between both kilns since the measuring operation can be executed in both directions. There is also the possibility of employing a plurality of devices next to each other, particularly with long rotary tubular kilns.

Figure 3:
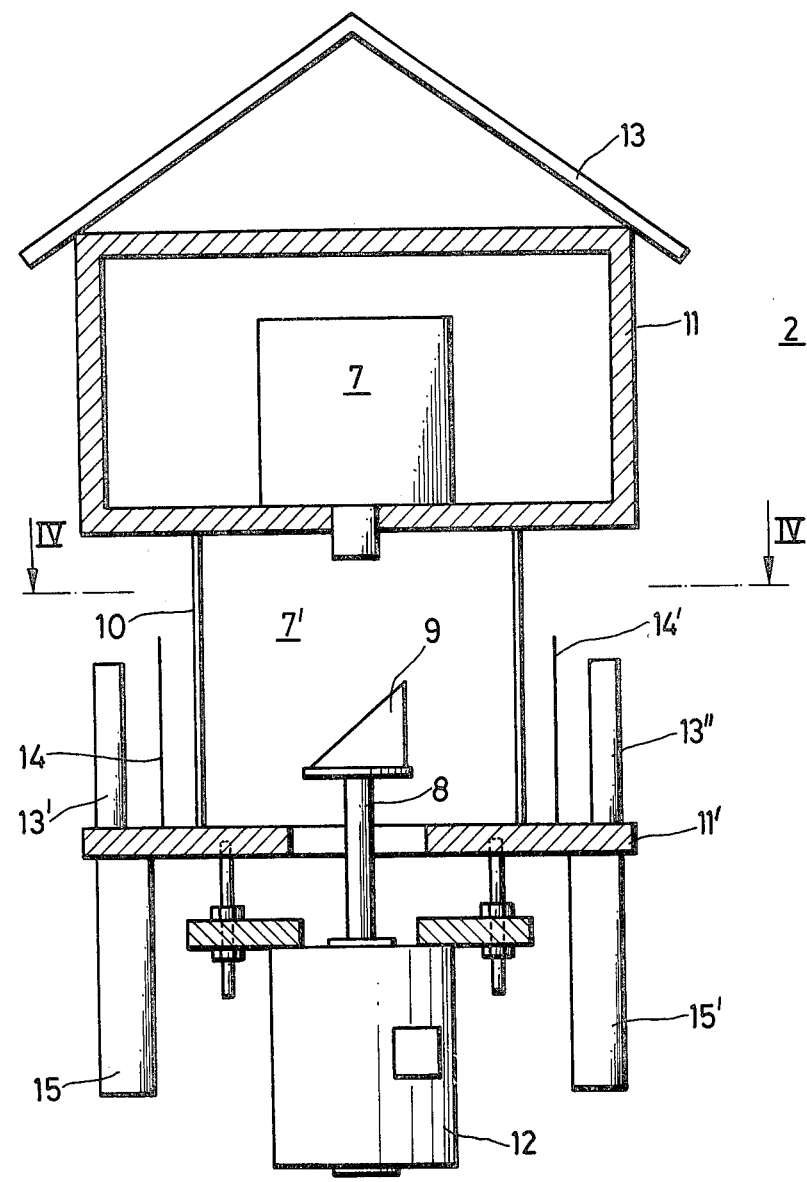
FIG. 3 is a view partly in elevation and partly in cross section of a device according to the present invention.

In the device shown in FIG. 3, the sensing device 2 consists of an infrared sensor 7 having a deflection means equipped with a drive shaft 8, the deflection means consisting of a prism 9 as well as a housing 10 whose purpose is to protect the device against dust. In this embodiment, the prism 9 and the infrared sensor form an optical system 7'. The housing 10 is closed toward the top by a cap 11 and is closed toward the bottom by means of a bottom plate 11' at which a drive 12 is disposed. The drive has an output drive shaft 8. With a constant frequency of line-wise scanning of the surface temperature, the drive, for example, can be a synchronous motor. With a variable scanning frequency, a variable speed motor or a stepping motor can also be used. The scanning device 2, if necessary, can be equipped with an additional sunshade 13. In addition, means for supply cooling air (not shown) which protects the inside space of the housing 10 may also be employed.

The torsion-proof housing 10 serves to protect against dust and can be surrounded by an outer housing through which air is supplied.

The bottom plate 11' carries the drive 12 and also supports reference radiators 13' and 13" at diametrically opposed sides. The surfaces of the reference radiators preferably consist of the same material as the jacket of the rotary tubular kiln so that the influence of the emissivity differences is eliminated.

It is advantageous to dispose at least one further reference radiator (not illustrated) in proximity to the rotary tubular kiln 1. The further reference radiator is heated by the thermal radiation from the rotary kiln and is designed, for example, as a stationary plate. The temperature of the plate is measured with a thermocouple so that comparison between the temperature measured by means of the thermocouple and the temperature measured by means of the device of the present invention is possible. By so doing, an even greater precision of the acquired measured values of the surface temperature is possible since disruptive influences which occur in the area of the transmission path of the thermal radiation can be quantitatively taken into consideration. It is expedient to dispose a plurality of such reference radiators along the rotary tubular kiln 1 particularly at portions having different temperatures.

The infrared sensor 7 can, for example, be a commercially available uncooled radiation thermometer with response times in the millisecond range or it can be a thermo-electrically cooled semiconductor detector, for example, consisting of InAs or HgCdTe having response times in the microsecond range. The selection of the sensor depends upon the object being tested, so that the spectral sensitivity of the sensor is limited to a range from approximately 1.5 to 5 microns. As a result, the employment of economically feasible optical materials, for example, such as infrared quartz is possible for the lenses in the housing 10, since they are not only temperature stable and abrasion-proof, but also are transparent in the visible range.

The infrared sensor 7 is preceded by a lens system (not illustrated in greater detail) for directing the beam path. For the purpose of compensating a projection error, the lens system can preferably be a telecentric lens system in which one or more cylindrical lenses are inserted so that the imaging property of the overall system is characterized by an astigmatism. Consequently, the change of the projection cross section between the different image lines which are vertical relative to one another, and the respective meridional and sagittal focal lengths in the beam direction, separated from one another by the astigmatic difference, is exploited. An image line is set to a point or surface element of the smallest distance, and the other image line is set to the greatest distance between the rotary tubular kiln and the sensing device 2. Instead of a cylindrical lens, clear elements such as prisms producing similar distortions or asymmetries can be employed.

The lens system can also be constructed solely of spherical lenses whereby the compensation of the projection error is achieved over the focus concerning a point or surface element of the rotary tubular kiln which lies between limiting points of smallest and greatest distance. It is also possible to employ a lens system with spherical lenses whose focal length is adjustable in accordance with the rotation of the prism 9.

Screen plates 14 or 14' which are provided with openings are situated directly between the reference radiators 13' and 13" and the prism 9, the screen plates providing for the formation of control signals in a manner to be subsequently described.

Reference numerals 15 and 15' indicate control devices for keeping the temperature of the radiator 13' or 13" constant.

Figure 4:
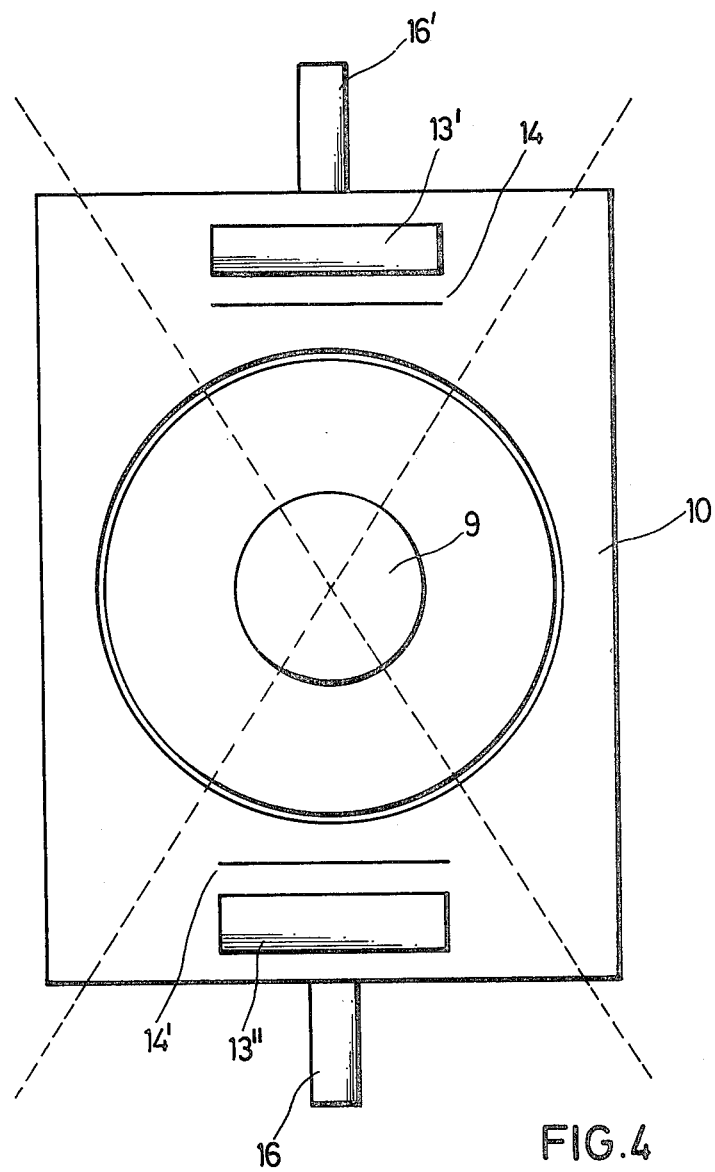
FIG. 4 is a cross-sectional view taken substantially along the line IV—IV of FIG. 3.

As shown in FIG. 4, the sensing device 2 is suspended along a tilting axis 16 or 16' so that the device can be set to a specific area of the jacket of the rotary tubular kiln 1.

The manner of functioning of the inventive device is as follows:

The prism 9 is placed in rotation by means of the drive 12, the rotations being matched with respect to the kiln speed and the aperture angle of the optical system 7' as well as the properties of the infrared sensor 7 so that the kiln jacket is scanned line-wise and surface-wide, so that the size of a surface element on the kiln jacket corresponds at most to approximately the size of a lining brick. It is thereby possible to identify topical overheating, for example, resulting from missing lining bricks and also recognizing such disruptions as ring formation.

After the conclusion of the measuring operation involving one line of the jacket of rotary tubular kiln 1, before the measured result of the line proceeds to further evaluation in any form, a calibration by means of the reference radiators 13' or 13" which are at different temperatures occurs. The temperature of the reference radiator 13' or 13" can be measured by means of a thermocouple so that the measured value is forwarded by the micro-computer for the purpose of evaluation in conjunction with the measured value forwarded by the infrared sensor 7. Consequently, a correction factor is derived from the comparison of the true and indicated temperatures which, if need be, can be incorporated into further geometrical or empirical factors so that an absolute measured temperature value can be identified. The influence of an increasing contamination, particularly from increasing dust on the housing 10 can be eliminated in this manner since the beam path of the rotary tubular kiln is essentially exposed to the same dust charges as that of the reference radiator 13' or 13". The measured results of reference radiators disposed in proximity to the rotary tubular kiln can thereby be employed in the identification of the absolute measured temperature values.

The screen plates 14 or 14' are equipped with openings of a specific size and sequence can serve as a pulse signal generator not only for the beginning and end of a measuring event such as a measuring line, but also serve as a speed-dependent self-calibration of the system. The screen plates also prevent unnecessary heating of the housing 10.

Figure 5:
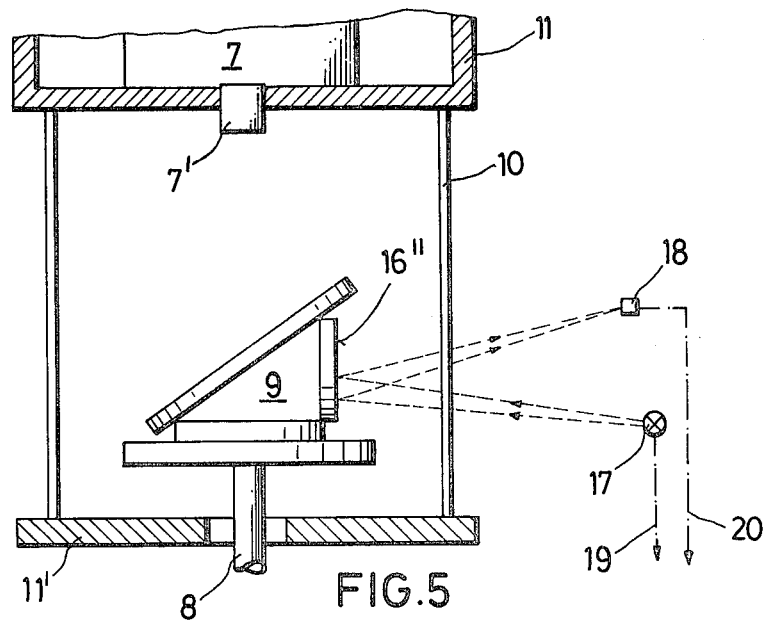
FIG. 5 is a fragmentary view partly in elevation and partly in cross section of a modified form of the present invention.

As shown in FIG. 5, the prism 9 can be equipped with an additional mirror element 16" at its side which faces away from the beam path to be measured. This mirror element cooperates with an external radiation source 17 and with an external radiation receiver 18. The radiation emitted by the radiation source 17 thus passes through the wall of the housing twice before it is again accepted by the radiation receiver 18 so that a more precise statement concerning the degree of dust coverage of the housing 10 can be formed from the ratio of emitted and received power. The radiation source 17 and the receiver 18 are attached to any location which does not impede the measuring operation, so that measured values for the respective emitted and received power are forwarded over the lines 19 or 20 to the data processing unit 3. Thus, another possibility of identifying the degree of dust coverage on the housing 10 is provided and can be employed alternatively to, or in addition to, the possibility already discussed in connection with FIGS. 3 and 4. Such a contamination monitoring with automatically triggered contamination alarm is, for example, required when the housing 10 can be contaminated differently in the measuring direction than it is in front of the reference radiators. The mirror element 16" can very advantageously be employed instead of an encoder for generating trigger pulses.

Figure 6:
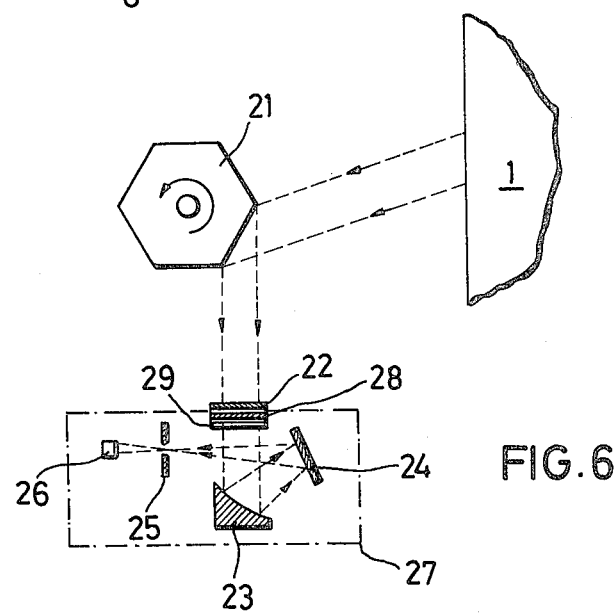
FIG. 6 is a somewhat schematic view of a modified optical system which can be used in accorance with the present invention.

In FIG. 6, there is shown a special embodiment of the optical system wherein the rotating prism 9 is replaced by a rotatably seated wheel 21 having a polygonal contour which is a hexagon in the illustrated instance, whose end faces are mirrored for beam guidance. From the wheel 21, the beam path proceeds over the closing window 22 toward a parabolic mirror element 23 which is an off-axis mirror and proceeds from there over a planar deflection mirror 24 and a diaphragm 25 to a semiconductor detector 26 which emits an electrical signal corresponding to the incident radiation.

The diaphragm 26 serves as a space filtration device and reflects brightly at the detector side so that the influence of the housing ray on the thermoelectrically cooled semiconductor detector is minimized. The semiconductor detector is situated in a mount with a fine pitch thread which serves the purpose of matching the aperture angle of the beam path.

The parabolic mirror element 23, the planar deflection mirror 24, the diaphragm 25, the semiconductor detector 26, as well as the closing window 22 are situated within a sensor housing 27 shown with dot-dash lines which, for example, can be composed of an aluminum block. As seen in the direction of the beam path, a filter 28 as well as an iris diaphragm 29 are situated behind the closing window 22 in order to limit the entering ray beam. As compared with mirrors, or lenses having spherical interfaces, the employment of a parabolic mirror 23 guarantees a more precise beam guidance for geometrical reasons. This system is hermetically closed by the sensor housing 27 in which there is located a preamplifier and devices for thermo-electrical cooling, so that it provides a particularly compact and rugged format.

The deflection means, for example the wheel 21, can also be incorporated in the sensor housing 27 advantageously.

The optical system of the devices of the present invention can preferably be constructed of resistant materials such as quartz, sapphire or metallic surface mirrors without special protection, due to the self-calibration. Cleaning of the devices, since they are situated at easily accessible locations, can be incorporated into routine maintenance programs.

It should be evident that various modifications can be made to the described embodiments without departing from the scope of the present invention.

We claim as our invention:

1. A method for monitoring the operation of a rotary drum while engaged in thermal processing of fine grained materials comprising
    scanning the infrared radiation from said drum at a scanning angle sufficient to cover the entire axial length of said drum from a stationary point outside said drum,
    comparing the derived scanning results with other parameters related to the thermal processing, including rate of fuel feed, rate of raw material input, drum speed and driving power to said drum, and
    comparing the measured values with the temperature sensed by a reference source subjected to the same conditions as in the scanning.

2. A method according to claim 1 wherein said reference source includes at least two reference radiators.

3. A method according to claim 1 wherein said reference source is disposed in proximity to the drum so as to be heated by the thermal radiation therefrom.

4. A method according to claim 1 which includes the step of:
    optically correcting projection errors in the sensing of the infrared radiation.

5. A method according to claim 4 which includes:
    utilizing spherical lenses of adjustable focal length to correct projection errors.

6. An apparatus for contact-free measurement of a rotating drum engaged in the thermal processing of fine grained materials comprising:
    first sensing means positioned in spaced relationship to said drum and arranged to scan the drum over its entire axial length, and including means for converting measured temperature values to electrical signals,
    second sensing means exposed to the same conditions as said first sensing means for generating electrical signals corresponding to incident infrared radiation received from said rotating drum, said two sensing means being located at different locations, and
    comparison means for comparing the signals from said first and second sensing means.

7. An apparatus according to claim 6 wherein said first sensing means includes at least one micro-computer, electronic monitoring devices, and temperature calibration devices.

8. An apparatus according to claim 6 in which: said second sensing means is disposed stationarily
    above the axis of rotation of said drum.

9. An apparatus according to claim 6 wherein said second sensing means includes a housing, a temperature sensor disposed within said housing, and at least one reference radiator at a constant, known temperature disposed outside said housing.

10. An apparatus according to claim 9 wherein said second sensing means includes an optical system and an infrared sensor.

11. An apparatus according to claim 10 which includes:
    a deflection means for directing an incident infrared ray toward said infrared sensor.

12. An apparatus according to claim 11 which includes at least one screen plate disposed between said reference radiator and said deflection means, said screen plate including openings for the generation of control signals.

13. An apparatus according to claim 11 wherein said deflection means is a rotatable prism.

14. An apparatus according to claim 11 in which said deflection means is a rotatable wheel having a polygonal contour and reflective end faces.

15. An apparatus according to claim 11 wherein includes a drive means for said deflection means and an encoder operated by operation of said drive means.

16. An apparatus according to claim 11 which includes:
    correction means in said optical system for correcting projection errors.

17. An apparatus according to claim 16 wherein said correction means are disposed in the path of the beam between said deflection means and said infrared sensor.

* * * * *